UNITED STATES PATENT OFFICE.

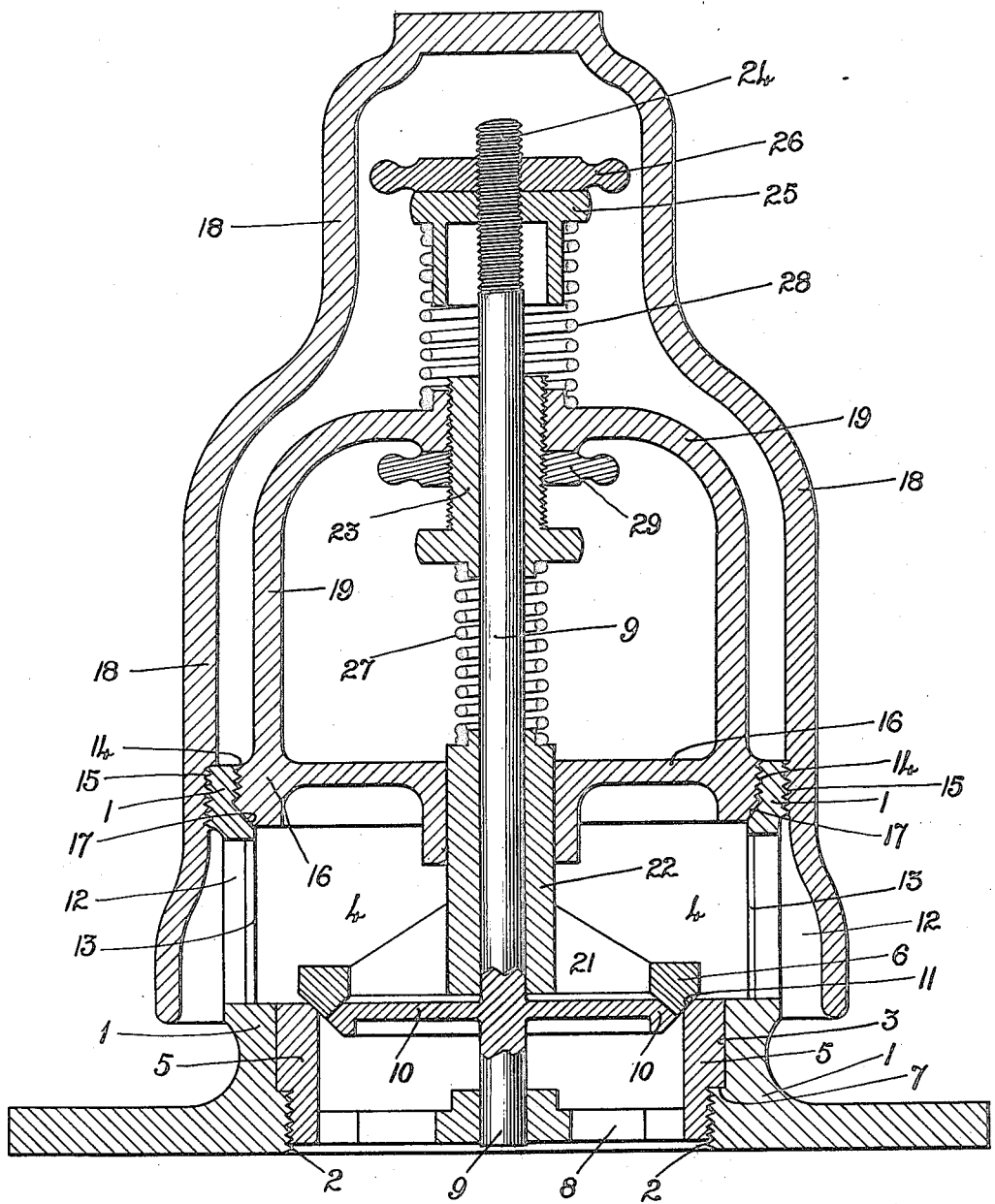

FREDERICK MORTIMER TIMPSON, OF ILFORD, AND ALEXANDER OGILVIE ROBERTSON, OF LONDON, ENGLAND, ASSIGNORS TO THE TIROS VALVE SYNDICATE, OF LONDON, ENGLAND.

COMBINED PRESSURE AND VACUUM RELIEF VALVE.

1,213,710.   Specification of Letters Patent.   Patented Jan. 23, 1917.

Application filed June 15, 1916.   Serial No. 103,903.

*To all whom it may concern:*

Be it known that we, FREDERICK MORTIMER TIMPSON and ALEXANDER OGILVIE ROBERTSON, subjects of the King of Great Britain, residing at Ilford and London, England, respectively, have invented certain new and useful Improvements in Combined Pressure and Vacuum Relief Valves, of which the following is a specification.

In pressure and vacuum relief valves hitherto constructed, and especially those employed in connection with oil compartments or tanks, difficulty has been experienced in overhauling, regulating or adjusting the valves while *in situ*, without their being entirely disconnected from their casing or carrier.

Now the object of this invention is to overcome this difficulty, and to construct a combined pressure and relief valve and the springs and carriers therefor, together with the seating of the pressure valve, in such a manner that the springs can be readily adjusted while the valves are *in situ* on the tank or other apparatus or conduit, all that is necessary being to remove the cover and actuate the spring tightening nuts by hand. Also by this construction, the further advantage is gained that the springs are entirely clear of any corrosive action emanating from fluids or liquids which are contained within the apparatus or appliances to which the valves are attached.

Our invention will be clearly understood from the following description aided by the annexed drawing which illustrates in sectional elevation our improved pressure and vacuum relief valve.

For the purpose of this invention, the valve chamber 1 which is attachable by any known means to the tank compartment, pipe or other part of an apparatus, installation or system in which the pressure or vacuum or both of liquids or fluids contained therein and required to be relieved, is constructed with a screw threaded opening 2 preferably at or near the base, and with an enlarged opening 3 above same leading into the body 4 of the chamber 1. Into this opening 2 is screwed the seating 5 for the pressure valve 6, the wall of the seating fitting tightly against the wall of the opening 3, and the shoulder 7 produced at the junction of the openings 2 and 3 being so constructed as to further insure a fluid tight fit between the valve seating 5 and the inner wall of the chamber.

The valve seating 5 is provided with a grid 8 near its base, the grid having a central hole in which the stem 9 of the vacuum valve 10 is positioned, while the beveled upper edge 11 of the valve seating 5 constitutes the seating proper.

The valve chamber 1 above the valve seating is provided with one or more holes 12 in the wall thereof, and these holes may be covered with fine wire gauze 13 which forms an effective screen or guard against internal ignition of escaping gases being effected from an outside source. The upper edge of this valve chamber is provided with internal and external screw threads, 14, 15, the inner thread 14 receiving a plate 16 which has a bearing on a seating 17, preferably angled and formed on the inner wall of the chamber, while the outer screw thread is to receive the cover 18.

The plate 16 is provided with a bridge 19, and both the center of the bridge 19 and the plate 16 are provided with holes in alinement with the hole in the grid 8 of the valve seating 5.

The pressure valve 6 is constructed as usual of a V ring, the outside of which fits the valve seating 5 in the chamber, while the inside surface forms a seating for the vacuum valve 10, as is usual. The V ring of the pressure valve is provided with ribs 21 from the center of which projects a vertical sleeve 22, this sleeve finding a position in the hole in the plate 16 and forming a fluid tight joint therewith. The vacuum valve 10 is a disk valve having an angled edge on its upper side to fit the seating on the pressure valve 6, and at the center of such vacuum valve is positioned the valve stem 9, one end of which projects below the valve and is positioned in the hole in the grid 8 of the valve seating, while the other portion projects above the vacuum valve and passes through the sleeve 22 on the pressure valve 6 and through an adjustable screw stem 23 secured in the hole in the bridge 19, the end of the stem 9 beyond the bridge 19 being cap threaded as at 24 for receiving a screw nut 25 and a lock nut 26.

Between the end of the sleeve of the pressure valve 22 and the adjustable screw stem 23, and encircling the valve stem 9, is positioned a spring 27 to normally keep the pressure valve 6 on its seating; and between the bridge 19 and the cap-nut 25 on the stem 9, and encircling said stem 9, is another spring 28 normally keeping the vacuum valve 10 on its seating, so that when pressure is to be relieved, the action on the vacuum valve 10 will move both valves 10 and 6, while when the vacuum is to be relieved, the action is only on the vacuum valve 10, the pressure valve 6 remaining on its seating.

29 is a lock nut to the adjustable screw stem 23.

The cover 18 is provided with an internal screw thread at some distance from the bottom edge, and on screwing same on to the outer screw thread 15 of the valve chamber 1, the upper part will inclose all the appliances above the plate 16, while the lower portion of the cover, which may be of larger diameter, forms a weather guard to the holes 12 in the wall of the chamber and prevents water entering the apparatus. When the cover 18 is removed the springs 27, 28, screw nuts 25, 26, and 29, and screw stem 23, bridge 19 and upper part of the rod 9 are exposed, so that by actuating the nut and screw stem the pressure on the springs 27, 28, may be easily regulated without removing the valves 13, 10, and their appurtenances, and if repairs or replacements are required, the bridge 19 and the valves and their appurtenances can easily be removed by unscrewing the plate, and the valve seating 5 can also be unscrewed from the chamber and any repairs or replacements effected.

What we claim and desire to secure by Letters Patent is:—

1. A combined pressure and vacuum relief valve appliance, consisting of a valve chamber having apertures in its wall, a valve seating fitted in said valve chamber, a grid carried by said seating and having a central hole, a plate secured to the top of the chamber and provided with a hole, a bridge carried by said plate, co-acting vacuum relief and pressure valves, a tubular stem on the pressure valve passing through the hole in said plate, a stem on the relief valve passing through the hole in said grid and through the tubular stem of the pressure valve, an adjustable screw stem engaging the bridge and through which the relief valve stem also passes, a nut threaded on the end of the relief-valve stem, springs between said nut and said bridge and between the adjustable screw stem and the stem on the pressure valve, and a cover attachable to the valve chamber so as to completely inclose the springs, bridge, plate, and nut, and the apertures in said chamber wall.

2. An appliance of the character specified, comprising, in combination, a valve chamber having its wall threaded internally; a valve seating fitted in said chamber; a centrally-apertured plate engaged with the thread on said chamber wall and provided with an elevated bridge having a central threaded opening alining with the aperture in said plate, a pressure valve arranged to fit against said seating and having an upstanding tubular stem extending through the plate aperture; an adjustable tubular stem engaged in the bridge aperture and located above the first-named tubular stem; a vacuum relief valve arranged to seat against the under face of the pressure valve and having a stem projecting upwardly through and beyond both tubular stems; a spring interposed between said tubular stems and exerting pressure downward upon the lower stem, so as to maintain the pressure valve normally closed, said spring having its pressure regulated by adjustment of the upper stem; a nut threaded on the projecting upper end of the relief valve stem; and a spring interposed between said bridge and said nut and exerting pressure upward against the latter, so as to maintain the relief valve normally closed, the last-named spring having its pressure regulated by adjustment of said nut.

3. An appliance of the character specified, comprising, in combination, a valve chamber having apertures in its side wall, and having said wall threaded both externally and internally above said apertures; a valve seating fitted in the base of said chamber; a centrally-apertured plate engaged with the internal thread on said chamber wall and provided with an elevated bridge having a central threaded opening alining with the aperture in said plate; a pressure valve arranged to fit against said seating and having an upstanding tubular stem extending through the plate aperture; an adjustable tubular stem ingaged in the bridge aperture and located above the first-named tubular stem; a vacuum relief valve arranged to seat against the under face of the pressure valve and having a stem projecting upwardly through and beyond both tubular stems; a spring interposed between said tubular stems and exerting pressure downward upon the lower stem, so as to maintain the pressure valve normally closed, said spring having its pressure regulated by adjustment of the upper stem; a nut threaded on the projecting upper end of the relief valve stem; a spring interposed between said bridge and said nut and exerting pressure upward against the latter, so as to maintain the relief valve normally closed, the last-named spring having its pressure regulated by adjustment of said nut; and a cover removably engaged with the external thread on said chamber and extending below said thread, so as to completely inclose said springs, nut, bridge, plate, valves and valve stems, and the apertures in said chamber wall.

4. An appliance of the character specified, comprising, in combination, a valve chamber having apertures in its side wall, and having said wall threaded externally above said apertures; a valve seating fitted in the base of said chamber; co-acting pressure and vacuum relief valves arranged within said chamber and provided with controlling springs for normally holding them individually closed, one of said valves being arranged to fit against said seating, and the other valve being arranged to seat against the under face of the first-named valve; and a cover removably engaged with the external thread on said chamber and extending below said thread, so as to completely inclose said valves and their controlling springs, and the apertures in said chamber wall.

In testimony whereof we have hereunto set our hands in presence of two subscribing witnesses.

FREDERICK MORTIMER TIMPSON.
ALEXANDER OGILVIE ROBERTSON.

Witnesses:
WM. O. BROWN,
FRED. T. HUTCHINGS.